US010515036B2

(12) United States Patent
Yuenyongsgool et al.

(10) Patent No.: US 10,515,036 B2
(45) Date of Patent: Dec. 24, 2019

(54) BIT MANIPULATION CAPABLE DIRECT MEMORY ACCESS

(71) Applicant: Microchip Technology Incorporated, Chandler, AZ (US)

(72) Inventors: Yong Yuenyongsgool, Gilbert, AZ (US); Stephen Bowling, Chandler, AZ (US); Cobus van Eeden, Chandler, AZ (US); Igor Wojewoda, Tempe, AZ (US); Naveen Raj, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/169,480

(22) Filed: Oct. 24, 2018

(65) Prior Publication Data

US 2019/0121761 A1 Apr. 25, 2019

Related U.S. Application Data

(60) Provisional application No. 62/576,966, filed on Oct. 25, 2017.

(51) Int. Cl.
*G06F 13/28* (2006.01)
*G06F 13/16* (2006.01)
*G06F 9/30* (2018.01)
*G06F 13/40* (2006.01)

(52) U.S. Cl.
CPC .......... *G06F 13/28* (2013.01); *G06F 9/30134* (2013.01); *G06F 13/1673* (2013.01); *G06F 13/4018* (2013.01); *G06F 2213/2806* (2013.01)

(58) Field of Classification Search
CPC ................. G06F 13/28; G06F 13/1673; G06F 2213/2806
See application file for complete search history.

(56) References Cited

U.S. PATENT DOCUMENTS

| 2004/0064600 A1 | 4/2004 | Lee et al. ........................ 710/22 |
| 2012/0110232 A1 | 5/2012 | Amitay et al. ................ 710/308 |
| 2016/0132445 A1 | 5/2016 | Birsan et al. ................. 710/308 |

FOREIGN PATENT DOCUMENTS

| EP | 2365444 A1 * | 9/2011 | ............. G06F 13/28 |
| EP | 2365444 A1 | 9/2011 | ............. G06F 13/28 |

OTHER PUBLICATIONS

International Search Report and Written Opinion, Application No. PCT/US2018/057437, 12 pages, dated Jan. 29, 2019.

* cited by examiner

*Primary Examiner* — Farley Abad
(74) *Attorney, Agent, or Firm* — Slayden Grubert Beard PLLC (57) ABSTRACT

A memory management circuit includes a direct memory access (DMA) channel. The DMA channel includes logic configured to receive a buffer of data to be written using DMA. The DMA channel further includes logic to perform bit manipulation in real-time during a DMA write cycle of the first buffer of data.

19 Claims, 3 Drawing Sheets

BIT MANIPULATION CAPABLE DIRECT MEMORY ACCESS

RELATED APPLICATIONS

The present application claims priority to U.S. Provisional Patent Application No. 62/576,966 filed Oct. 25, 2017, the contents of which are hereby incorporated in their entirety.

FIELD OF THE INVENTION

The present disclosure relates to memory access and, more particularly, to bit-manipulation-capable direct memory access (DMA).

BACKGROUND

For memory transfer operations between different memories or parts of memory, a processor may use programmed input and output instructions to read, write, and set data. However, such instructions carried out by the processor may be slow due to latency of memory access. Access of memory might require physical interface with mechanical or electronic elements of the memory. The instruction, performed by the processor, will not end until the read or write is finished. The processor is thus waiting on the instruction to end which, as described above, may be slow to perform because of the memory latency. The processor, or the thread of the processor assigned to the task, may be unavailable to perform other tasks during this operation.

DMA may allow the processor to offload writing or reading blocks of data between memory locations. DMA may be implemented by a separate controller or circuit. The DMA controller may have an interface through which the processor or peripherals of a system may call the DMA controller to read or write the blocks of data. The processor or peripherals may perform other tasks while the DMA controller is operating to read or write blocks of data. When the DMA controller is finished, the DMA controller may issue an interrupt or other signal to the processor or peripheral.

SUMMARY

Embodiments of the present disclosure include a memory management circuit. The memory management circuit may include a first DMA channel. The DMA channel may include logic configured to receive a first buffer of data to be written using DMA. The memory management circuit may include a first circuit including logic configured to perform bit manipulation in real-time during a DMA write cycle of the first buffer of data. In combination with any of the above embodiments, the first circuit may further include logic to perform bit manipulation with a set function. In combination with any of the above embodiments, the first circuit may further include logic to perform bit manipulation with a clear function. In combination with any of the above embodiments, the first circuit may further include logic to perform bit manipulation with an invert function. In combination with any of the above embodiments, the first circuit may further include logic to perform bit manipulation with a set function prioritized above a clear function. In combination with any of the above embodiments, the first circuit may further include logic to perform bit manipulation with a set function prioritized above an invert function. In combination with any of the above embodiments, the first circuit may further include logic to perform bit manipulation with a clear function prioritized above an invert function.

In combination with any of the above embodiments, the memory management circuit may further include a second DMA channel. The second DMA channel may include logic configured to receive a second buffer of data to be written using DMA and a second circuit including logic configured to perform bit manipulation in real-time during a DMA write cycle of the second buffer of data. In combination with any of the above embodiments, the first buffer of data may include a bit indicating that a first in first out (FIFO) shift register is full. In combination with any of the above embodiments, the first circuit may be configured to reset the bit indicating that the FIFO shift register is full during a rewrite of a byte including the bit while masking other bits of the byte. In combination with any of the above embodiments, the first DMA channel may further include logic to send a trigger to the second DMA channel. In combination with any of the above embodiments, the second DMA channel may be further configured to load contents of the FIFO shift register into the second buffer upon reception of the trigger. In combination with any of the above embodiments, the second circuit may include logic to write the second buffer to a destination during another DMA write cycle.

In combination with any of the above embodiments, the memory management circuit may further include second DMA channel. In combination with any of the above embodiments, the second DMA channel may include logic configured to receive a second buffer of data to be written using DMA, and a second circuit including logic configured to perform bit manipulation in real-time during a DMA write cycle of the second buffer of data. In combination with any of the above embodiments, the first buffer of data may include mask information for the second circuit. In combination with any of the above embodiments, the first circuit may be configured to issue a trigger to the second DMA channel upon loading data into the first buffer. In combination with any of the above embodiments, upon reception of the trigger, the second circuit may be configured to apply bit manipulation using the mask information from the first buffer of data to the second buffer during a DMA write of the second buffer. In combination with any of the above embodiments, the second circuit mat be configured to write the second buffer to a source of the second buffer using the bit manipulation using the mask information.

Embodiments of the present disclosure include a microcontroller. The microcontroller may include a processor and any of the memory management circuits of the above embodiments.

Embodiments of the present disclosure may include methods performed by any of the memory management circuits of the above embodiments.

DETAILED DESCRIPTION

Figure 1:
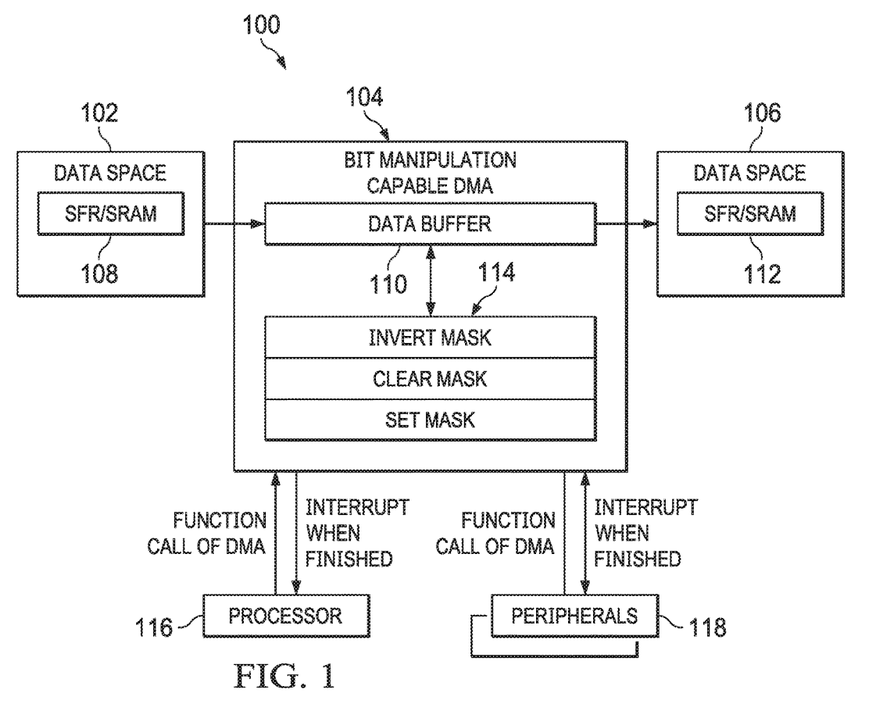
FIG. 1 is an illustration of a system for bit manipulation in DMA, according to embodiments of the present disclosure.

FIG. 1 is an illustration of a system 100 for bit manipulation in DMA, according to embodiments of the present disclosure. System 100 may be implemented in any suitable environment, such as a microcontroller, system on a chip (SoC), computer, tablet, smartphone, server, printer, router, industrial automation controller, automotive electronics system, or any other suitable electronic device. System 100 may include a DMA controller 104 configured to transfer memory from a data space 102 to another data space 106.

DMA controller 104 may be implemented by analog circuitry, digital circuitry, or any suitable combination thereof. DMA controller 104 may include a data buffer 110. Furthermore, DMA controller may include a bit manipulation mask circuit 114.

Data space 102 and data space 106 may include any suitable kind of memory or other elements to store data in system 100. For example, data space 102 may include a special function register (SFR) or a series of memory locations in static random access memory (SRAM) 108. Similarly, data space 106 may include an SFR or SRAM 108.

DMA 104 may be configured to transfer memory from data space 102 to data space 106, and from data space 106 to data space 102. In one embodiment, data spaces 102, 106 might not be persistent storage. DMA 104 may make such transfers on behalf of other portions of system 100, such as processor 116 or peripherals 118. In other cases, DMA 104 may be used for intra-chip data transfer within processor 116 or peripherals 118 in multi-core processors.

Processor 116 may be implemented by a single or multi-core processor, or a single or multithreaded processor. Processor 116 may be implemented in, or peripherals 118 may include, for example, digital signal processors, printers, disk drive controllers, graphics cards, network cards, or sound cards.

By using DMA 104, rather than direct input and output to data spaces 102, 106, processor 116 and peripherals 118 may be able transfer blocks of data between data spaces 102, 106 without less processor overhead. Furthermore, by using DMA 104 inside a multi-core implementation of processor 116, processor 116 can transfer data to and from its local memory without occupying its processor time, allowing computation and data transfer to proceed in parallel. DMA 104 may be used for memory-to-memory copying or moving of data within memory. DMA 104 may be used in cases when processor 116 or peripherals 118 cannot keep up with a rate of data transfer, or when processor 116 or peripherals 118 need to perform other tasks waiting for a relatively slow I/O data transfer. Processor 116 or peripherals 118 may offload expensive memory operations, such as large copies or scatter-gather operations, from the CPU to a dedicated DMA engine.

DMA 104 transfers data between data spaces 102, 106 in blocks. The blocks may be defined in terms of bytes or words, with a minimum amount of data that is to be transferred between data spaces 102, 106. This minimum amount of data is a trade-off for the efficiency gained in transferring the data via DMA. Other implementations of DMA do not allow for transfers of data smaller than the defined byte or word. In such other implementations of DMA, processors or peripherals will make direct input and output commands to transfer data between data spaces, rather than using DMA. Bit-wise or bit manipulations for sub-word or sub-byte transfers are not possible. Alternatively, in other such implementations of DMA, processors or peripherals may apply masks to DMA operations, but such application requires direct access or manipulation by the processor or peripherals to the memory locations, and thus suffers from the same problems of latency and bandwidth utilization. Such a combination of DMA with direct input and output commands by processors or peripherals circumvent some of the benefits of DMA usage.

In contrast, embodiments of the present disclosure include bit manipulation performed by DMA 104 during the DMA process of transferring data. Such bit manipulation may occur in real-time. Furthermore, the bit manipulation may be performed within DMA 104. In addition, the bit manipulation may be asynchronous with respect to processor 116 or peripherals 118, just as other DMA operations are asynchronous with respect to processor 116 or peripherals 118. Bit manipulation may be performed on data streamed through DMA 104 as such data is streamed through DMA 104. Bit manipulation may be performed on data streamed through DMA 104 during a same clock cycle as the data is to be stored in the destination data space. The bit manipulation may be performed in an on-the-fly manner in contrast to operations required Bit manipulation to be performed by DMA 104 may be used, for example, for first-in-first-out (FIFO) memory operations, or for bit-banging as part of a telecommunications protocol. Moreover, bit manipulation may be performed by DMA 104 to augment otherwise typical transfers of data using DMA. For example, DMA transfers may typically transfer an entire word or byte of data from one data space to another. However, the total range of data to be transferred might not fit evenly within a whole number of words or bytes. Thus, a DMA transfer of data will be overinclusive or underinclusive. The DMA transfer may be overinclusive in that more than the requested amount of memory is transferred from one data space to another. The extra amount of memory may reflect additional data addresses that, while not specifically requested to be moved to the new location, are moved because the additional data addresses reside within a same word or byte in the source data space as data to be transferred to the new data space. These additional data addresses may reflect nonsense, garbage data, or other disruptive or useless information with respect to the intended recipient. If such data is transferred along with the data that is intended to be transferred in the DMA process, then the write of data must be fixed in a postscript process by the processor or peripheral device. Similarly, the DMA transfer may be underinclusive in that, in order to avoid the overinclusive transfer of data, data addresses to be transferred that incompletely fill a word or byte might not be transferred using DMA. Instead, the processor or peripheral devices may themselves make direct input and output transfers to data spaces to fill in the missing data addresses that would otherwise incompletely fill a word or byte. The management of such data transfers may be slow and resource intensive. In contrast, bit manipulation performed by DMA 104 may accommodate such data by, for example, masking out the write of such data to the destination data space.

DMA 104 may include a data buffer 110. Data buffer 110 may be a temporary storage filled by a byte or word from data space 102 to be written to data space 106. DMA 104 may include other instances of data buffer 110, thus manifesting separate DMA channels.

In one embodiment, DMA 104 may include masking circuit 114. Masking circuit 114 may be implemented by analog circuitry, digital circuitry, or any combination thereof. More detailed implementations of masking circuit 114 may be found, for example, below within the context of FIG. 2. Masking circuit 114 may include or may be configured to access one or more masking registers. The masking registers may define, on a bit-by-bit basis, one or more logical operations to be performed on data to be transferred to the destination data space in data buffer 110. Each register may be the size of or width of data buffer 110. Each register may be the size of or width of a word or byte to be sent to a destination all at once as part of the DMA process.

Masking circuit 114 may be configured to perform any suitable number and kind of logical operations. In one embodiment, masking circuit 114 may be configured to perform setting operations. In such operations, the bits of a mask may define bits of destination data space 106 that are to be set by the corresponding values of data buffer 110. In another embodiment, circuit 114 may be configured to perform clearing operations. In such operations, the bits of a mask may define bits of destination data space 106 that are to be cleared. In yet another embodiment, circuit 114 may be configured to perform inversion operations. In such operations, the bits of a mask may define bits of data buffer 110 that are to be inverted and then written to the destination data space 106.

In one embodiment, masking circuit 114 may be configured to selectively apply a single one of the available bit manipulation operations. Masking circuit 114 may be configured to maintain a hierarchy of available bit manipulation operations such that, if more than one type of bit manipulation operation is requested, only the more-preferred operation is performed. For example, setting bit values may be a most preferred operation, followed by clear bit values, followed by inverting bit values.

Processor 116 and peripherals 118 may be configured to call DMA 104 to transfer data in a DMA manner from data space 102 to data space 112. Such a call may be performed, for example, by a function call of DMA 104. When DMA 104 has completed its transfer, notification may be made to the calling processor 116 or peripheral 118 in any suitable manner. For example, DMA 104 may issue an interrupt with the transfer is finished, or when an error condition has occurred making completion not possible.

Processor 116 and peripherals 118 may configured to invoke the bit manipulation operations of DMA 104 in any suitable manner. In one embodiment, processor 116 and peripherals 118 may invoke normal DMA transfer by DMA 104 with one command, and may invoke DMA transfer with bit manipulation with another command. In another embodiment, processor 116 and peripherals 118 may invoke normal DMA transfer and invoke DMA transfer with bit manipulation with a same command. In such an embodiment, bit manipulation during DMA transfer may be performed by setting or enabling bits in masks or registers accessed by circuit 114.

Embodiments of the present disclosure may eliminate CPU intervention—the DMA bit manipulation performed by circuit 114 may be performed without additional bus utilization or latency compared to normal DMA operation performed by DMA 104. Bit manipulation performed by circuit 114 may be performed upon kicking off or terminating an operation on a DMA trigger.

Figure 2:
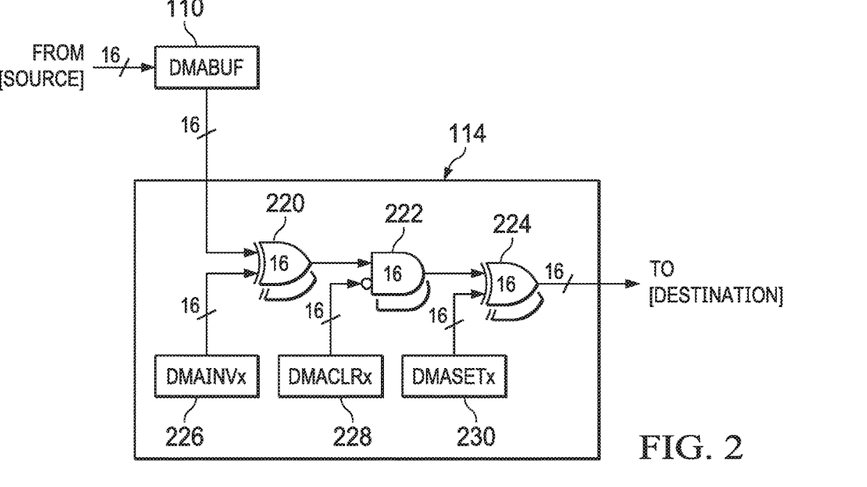
FIG. 2 is a more detailed view of a masking circuit, according to embodiments of the present disclosure.

FIG. 2 is a more detailed view of masking circuit 114, according to embodiments of the present disclosure. Data to be transferred from one data space to another data space may be entered in data buffer 110. As discussed above, data buffer 110 may be of a particular word or byte size, such as 16-bits. Masking circuit 114 may process the contents of data buffer 110 and write these elements to the destination data space in a single clock cycle.

Masking circuit 114 may include or may be configured to access registers or other sources of information defining the bit manipulation operations that are to be performed on the data of data buffer 110. Furthermore, such registers or other sources of information may define which bits are to be manipulated by such operations. Register contents may be referenced as "set" to indicate that associated contents are to be manipulated, and referenced as "unset" to indicate that associated contents are not to be manipulated. In various implementations, the set or unset state of a given bit may be implemented with logic high (a "1") or a logic low (a "0").

In one embodiment, masking circuit 114 may include or be configured to access a register 226 or other source of information defining an inversion operation. Register 226 may be given as "DMAINVx". If any bits of register 226 are set, masking circuit 114 may be configured to invert the values of data buffer 110 designated by the set bits. Other values of data buffer 110, corresponding to unset bits, might not be inverted. The result may be passed to other portions of masking circuit 114. Inversion may be implemented by one or more XOR gates 220 with inputs from the register bits and data as-received from data buffer 110. XOR gates 220 may be implemented by a bitwise XOR gate or by more than one XOR gate in a quantity sufficient to serve the size of data buffer 110 in parallel.

In one embodiment, if preferred bit manipulations, such as clearing or setting, are to be performed on a given bit, then inversion for such a given bit might not be performed. If register 226 indicates that such a given bit is to be inverted, but the given bit is to be cleared or set by other portions of masking circuit 114, the inversion operation may be overridden. In another embodiment, inversion might still be performed for such a given bit, but the inverted contents may be later further manipulated by other portions of masking circuit 114.

In one embodiment, masking circuit 114 may include or be configured to access a register 228 or other source of information defining a clearing operation. Register 228 may be given as "DMACLRx". If any bits of register 228 are set, masking circuit 114 may be configured to clear the values of data buffer 110 as-received from XOR gates 220 designated by the set bits. Other values of data buffer 110 as-received from XOR gates 220, corresponding to unset bits, might not be cleared. The result may be passed to other portions of masking circuit 114. Inversion may be implemented by one or more AND gates 222 with an inverting input for the bits from register 228 and an input from data-received from XOR gates 220. AND gates 222 may be implemented by a bitwise AND gate or by more than one AND gate in a quantity sufficient to serve the size of data buffer 110 in parallel.

In one embodiment, if preferred bit manipulations, such as setting, are to be performed on a given bit, then clearing for such a given bit might not be performed. If register 228 indicates that such a given bit is to be cleared, but the given bit is to be set by other portions of masking circuit 114, the clearing operation may be overridden. In another embodiment, clearing might still be performed for such a given bit, but the cleared contents may be later further manipulated by other portions of masking circuit 114.

In one embodiment, masking circuit 114 may include or be configured to access a register 230 or other source of information defining a setting operation. Register 230 may be given as "DMASETx". If any bits of register 230 are set, masking circuit 114 may be configured to set the values of data buffer 110 as-received from AND gates 222 designated by the set bits. Other values of data buffer 110 as-received from AND gates 222, corresponding to unset bits, might not be set. The result may be passed as output of masking circuit 114 to a data space destination. Setting may be implemented by one or more OR gates 224 with inputs for the bits from register 228 and as-received from AND gates 222. OR gates 224 may be implemented by a bitwise OR gate or by more than one OR gate in a quantity sufficient to serve the size of data buffer 110 in parallel.

DMA 104 may include multiple instances (not shown) of data buffer 110 and some or all of masking circuit 114, thus manifesting separate DMA channels. Dedicated mask registers and thus instances of registers 226, 228, 230 may exist for each DMA channel.

Applications of circuit 114 may include, for example, FIFO data transfer, or status bit manipulation used with FIFO data transfer. Circuit 114 may be used to perform bit banging or port register manipulation on a DMA trigger in communication. The specific bit banging or FIFO operation may be defined by the values set in registers of circuit 114. The FIFO or bit banging may send an initialization or termination signal to, for example, a peripheral or client device. Thus, a DMA trigger can be used to send such signals. Kicking off or terminating slave devices on a DMA trigger may be used for efficient control of communication.

A bit enable function with a read-modify-write may be made for memory column modification. For example, data may be selectively read from data space 102 and rewritten to the same address in data space 102 using masks of circuit 114. The data may be read a byte at a time and fed into buffer 110. The particular desired rewrite may dictate the masks of circuit 114 that are to be used. For example, if the memory column modification is intended to set the first and third bits (starting with the least significant bits (LSB)) of eight-bit bytes, then register 230 may define a mask of "00000101". Registers 226, 228 may each be "00000000" or the contents therein may be overridden by register 230. Each line or row of a column of memory may in turn be fed into circuit 114 from buffer 110 and circuit 114 may set the first and third bits, maintaining the integrity of the others of the eight bits during a rewrite back into the same row from which the memory was read. The next row of eight bits may similarly be processed by circuit 114. In another example, if the memory column modification is intended to clear all bits in the lower four bit positions of a memory column, then register 228 may define a mask of "00001111". Registers 226, 230 may each be "00000000", or the contents of register 226 may be overridden by register 228. Each line or row of a column of memory may in turn be fed into circuit 114 from buffer 110 and circuit 114 may clear the lower four bits in rewrite back into the same row from which the memory was read, maintaining contents of the other four bits. The next row of eight bits may similarly be processed by circuit 114.

DMA 104 or masking circuit 114 may be implemented as a stand-alone or portable logic block. For example, these may be implemented as an internal peripheral in a microcontroller. Bus mastering circuits or controllers may be included in or interfaced with DMA 104 or masking circuit 114 to allow access to internal memory mapped registers, thereby, lowering the demands for the peripheral's own processor.

Figure 3:
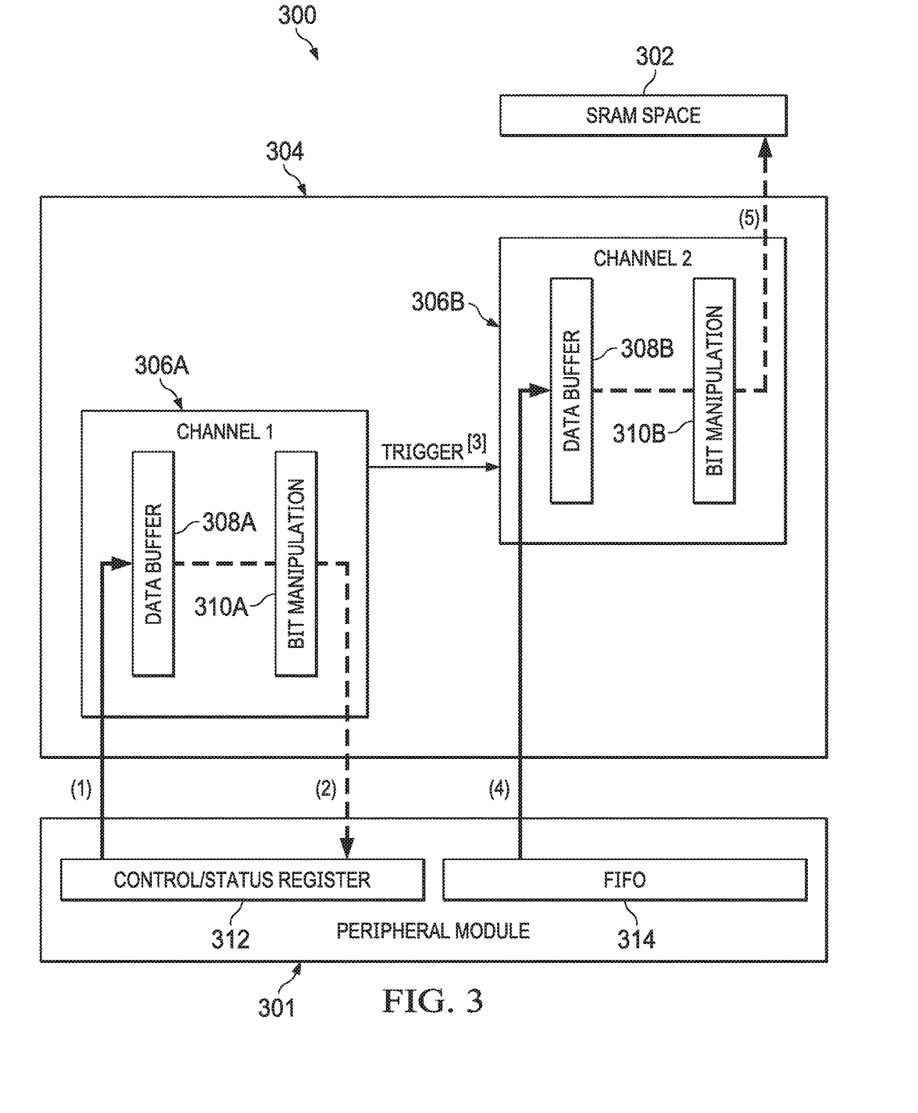
FIG. 3 is an illustration of an example application of DMA for first-in-first out applications, according to embodiments of the present disclosure.

FIG. 3 is an illustration of an example application of DMA for FIFO, according to embodiments of the present disclosure. DMA 304 may be a more particular instance of DMA 104. DMA 304 may include two channels, 306A, 306B. Each channel 306 may include respective data buffers 308 and bit manipulation masking circuits 310. Data buffers 308 may be more particular instances of buffer 110, and circuits 310 may be more particular instances of circuit 114.

DMA 304 may be configured to process data from a peripheral 301 for FIFO operations. FIFO operations may include, for example, a serial output, serial peripheral interface (SPI) operations, a uART, or other application. Serial data may arrive wherein each bit is clocked into a shift register. Once an entire byte or word (depending upon the size of the shift register) is gathered, the entire collected byte or word is shifted into a FIFO. The data may then be processed as a whole in the FIFO for, for example, serial operations. At such a point, the shift register may again be empty. In other implementations of FIFO, to take data from the shift register and put it into FIFO may require generating an interrupt to the CPU. In one embodiment, DMA 304 may be configured to avoid such involvement of the CPU.

FIFO operations for a peripheral may typically involve two bus transactions. In a first phase, a control or status register 312 may be accessed. In a second phase, data may be moved.

Bits may arrive at a shift register (not shown) in peripheral 301. When such a shift register is full, its contents may be available to be put into FIFO 314 all at once. From there, such data may be issued via DMA to a destination, such as SRAM space 302. When the shift register is full, in other embodiments an interrupt may be raised to a CPU. In contrast, in one embodiment when the shift register is full, a bit may be set in control/status register 312. Such a bit may be used to automatically perform a DMA transfer for the contents of the shift register, independently and autonomously without CPU assistance.

The first channel 306A of DMA 304 may be configured to monitor for setting of the bit in control/status register 312. The second channel 306B of DMA 304 may be configured to transfer data from FIFO 314 to SRAM 302 upon detection of the bit by the first channel 306A of DMA 304. Channel 306A may be configured to issue a trigger to channel 306B upon its completion of detection of the bit of control/status register 312.

DMA 304 may be configured to kill an interrupt intended for a CPU generated from filling the shift register. Peripheral 301 may set any suitable bit of control/status register 312. For example, bit 8 may be a designated bit for setting off a read-write of the same designated bit. The entire control/status register 312 may be loaded into buffer 308A. The value of bit 8 may be cleared with a clear mask of "1 0000 0000" in circuit 310A. The cleared value at bit 8, along with the untouched other bits of the read value of control/status register 312, may be written back to control/status register 312.

Once its FIFO 314 is ready for processing, peripheral 301 may interrupt or trigger DMA 304 with its control/status register 312 bits set or cleared accordingly. DMA 304 may be configured to respond by programming control/status register 312 to get peripheral 301 ready for the next phase.

During a second data movement phase, data may be taken from FIFO 314 to other memory locations, such as SRAM 302. This may be performed by channel 306B of DMA 304. No bit manipulation might be performed by circuit 310B. Its masks may be all "0" values indicated that writes of the source FIFO 314 are to be made to SRAM 302 without bit manipulation. The write may be triggered based upon a trigger from channel 306A.

FIFO processing may perform independent of processing cores of peripheral 301 or a processor accessing peripheral 301. Control/status register 312 may be configured to call a macro to access data buffer 308A as part of a shared read data bus. Returning data from masking circuit 310A to control/status register 312 may be shared with the shared write data bus. When channel 306A has finished, it may issue an interrupt input for channel 306B. Thus, channel 306A may act as a FIFO trigger to the other channel 306B. Furthermore, channel 306A manipulates control/status register bits of peripheral 301. Triggering channel 306B may cause movement of the data from FIFO 314 to SRAM 302 through buffer 308B.

Channel 306A may perform a read-modify-write operation with circuit 310A on bits received from control/status register 312 and then rewritten to control/status register 312. The rewrite of bits to control/status register 312 may initiate the FIFO data transfer performed by channel 306B. Channel 306A may program its source and destination address pointers to the same location—control/status register 312—and thus read the content of control/status register 312, manipulate the relevant bits based on the properly preprogrammed mask registers in circuit 310A, and write the modified content back into the same location in control/status register 312, thereby accomplishing a read-modify-write operation independent of its processor.

Figure 4:
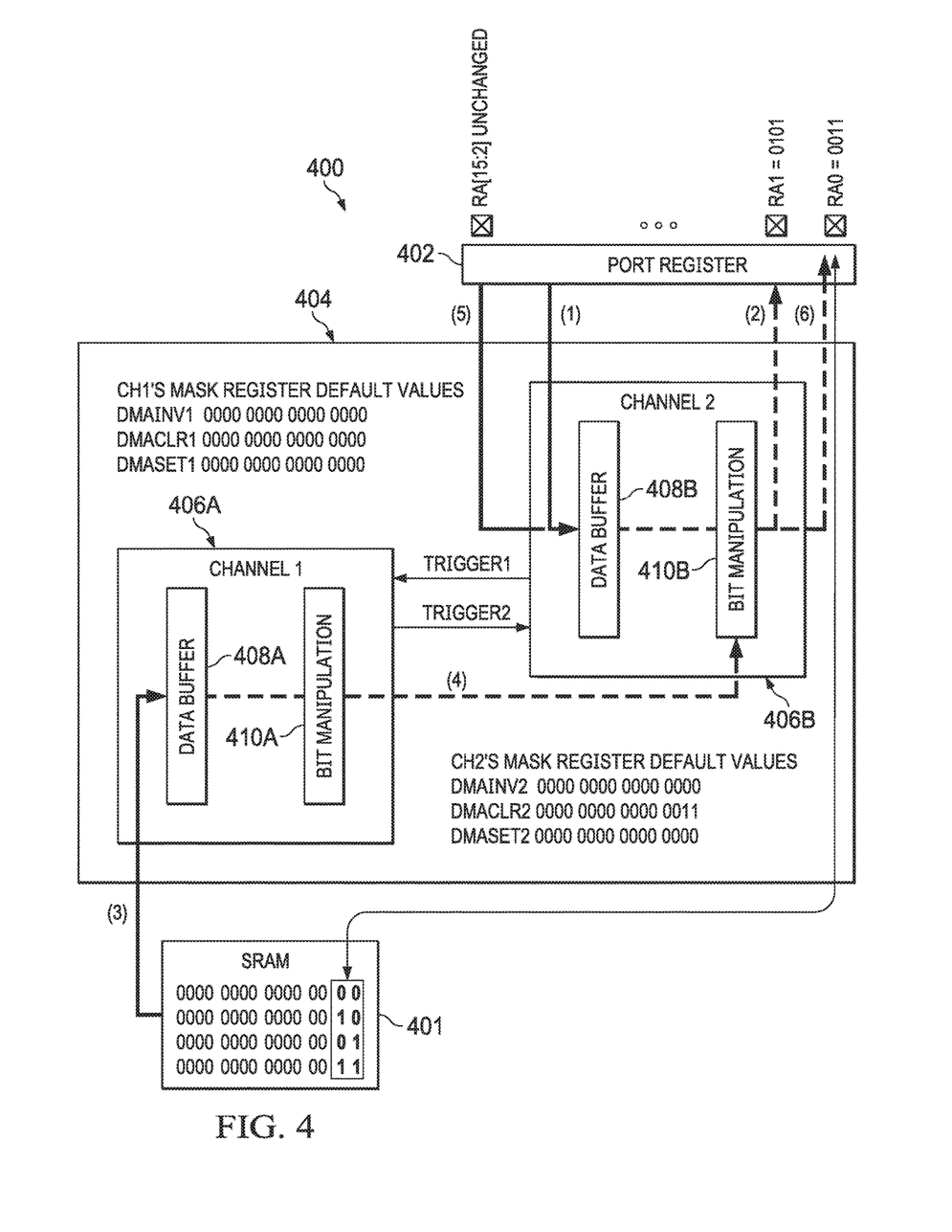
FIG. 4 is an illustration of core-independent bit banging, according to embodiments of the present disclosure.

FIG. 4 is an illustration 400 of core-independent bit banging, according to embodiments of the present disclosure. Illustration 400 may illustrate an implementation of system 100. For example, DMA 404 may implement DMA 104 with two instances of channels 406, each including a data buffer 408 and bit manipulation masking circuit 410.

Bit banging may refer to a series or pattern of bits to be issued to a bus, network, device, or other suitable destination. Bit banging output may be performed through DMA writes. The specific pattern of bit banging to be performed may depend entirely upon the particular protocol, handshake, exchange, shared secret, or other agreed-up specified communication method. The pattern of bit banging to be issued may change during different phases Bit banging may otherwise require use of a processor to continuously process patterns of bits to be issued. However, given bit manipulation capability of DMA 404, bit banging may be performed independent of processor intervention.

While any suitable bit banging may be performed, in the example of FIG. 4, a distinct pattern of values for the two least significant bits of a sixteen-bit byte may be varied in a particular sequence. The particular sequence may be "00", "10", "01", "11". Other sequences could involve fewer or more bits, or repetitions or omissions of the values of the sequence.

Output of the sequence may be made on a port register 402 (RA) through DMA writes. Port register 402 may be an output to a network or other device. In particular, output of the sequence may be made on the two least significant bits of port register 402, RA0 and RA1.

To perform the bit banging, as a first phase, DMA 404 may clear RA0 and RA1 of port register 402. The second channel, 406B, may have as its initial, default mask values, "0000 0000 0000 0000" for the inversion mask, "0000 0000 0000 0011" for its clear mask, and "0000 0000 0000 0000" for its setting mask for bit manipulation masking circuit 410 operation. At (1), a value of port register 402 may be read into buffer 406B. At (2), the masks may be applied to this value in buffer 406B and written back via DMA to port register 402. By applying a clear mask of "0000 0000 0000 0011", the lowest two bits, RA0 and RA1, of port register 402 may be cleared while the other fourteen values of port register 402 are maintained.

DMA channels 406A and 406B may include triggers that are activated upon completion of DMA operations. DMA channel 406A may set its trigger to notify DMA channel 406B upon completion of operation of DMA channel 406A. DMA channel 406B may set its trigger to notify DMA channel 406A upon completion of operation of DMA channel 406B.

As a second phase, values of RA0 and RA1 may be manipulated. In one embodiment, values in SRAM 401 may be used to sequentially set one or masks of channel 406B. The masks as set in channel 406B for circuit 410B may cause the bit banging and issuance of the sequence in port register 402. A given mask value may be loaded from a line or row in SRAM 401. The mask value may exist simply as data.

Upon reception of a trigger from channel 406B, operation may begin in channel 406A. At (3), the mask value may be loaded into buffer 408A of the first channel 406A. Masks of channel 406A may be set to all "0" values, meaning that no bit manipulation might be performed by circuit 410A. At (4), channel 406A may write its values in a DMA manner to a suitable mask register of the second channel 406B. For example, the values may be written to the set mask of circuit 410B. Thus, the contents of each given line of memory in SRAM 401 may control the set mask of circuit 410B. When channel 406A finishes writing these values to the set masks of circuit 410B, channel 406A may issue a trigger to channel 406B, which may begin operation.

At (5), the contents of port register 402 may be read into buffer 408B. At (6), the contents of port register 402 may be rewritten back into their location at port register 402, but with bit manipulation as performed by circuit 410B according to the mask values that were provided from SRAM 401.

The mask values read from SRAM 401 may be applied to a set mask in circuit 410B. The clear mask values that exist by default may remain in circuit 410B. When a given bit is to be both cleared (with a "1" in the clear mask) and set (with a "1" in the set mask), the set mask may take priority and the mask may be set. SRAM 401 may be continually reread (starting over if necessary) and port register 402 continually rewritten until a designated time.

For example, a first line of SRAM 401 may be "0000 0000 0000 0000", meaning that the set mask of circuit 410B is to be "0000 0000 0000 0000". The clear mask may be "0000 0000 0000 0011". The value of port register 402 may be loaded in buffer 408B. The highest fourteen bits may be unchanged. Bit RA1 may be cleared by the clear mask. Bit RA0 may be cleared by the clear mask. The set mask may have no effect as it is all "0" values. The resulting value of the lowest two bits of port register 402 may be "00".

A second line of SRAM 401 may be "0000 0000 0000 0001", meaning that the set mask of circuit 410B is to be "0000 0000 0000 0001". The clear mask may be "0000 0000 0000 0011". The value of port register 402 may be loaded in buffer 408B. The highest fourteen bits may be unchanged. Bit RA1 may be cleared by the clear mask. The set mask may have no effect on bit RA1 as the corresponding value is a "0" in the set mask. Bit RA0 may be set by the set mask. The corresponding value in the clear mask may be overridden by this "1" value in the set mask. The resulting value of the lowest two bits of port register 402 may be "01".

A third line of SRAM 401 may be "0000 0000 0000 0010", meaning that the set mask of circuit 410B is to be "0000 0000 0000 0010". The clear mask may be "0000 0000 0000 0011". The value of port register 402 may be loaded in buffer 408B. The highest fourteen bits may be unchanged. Bit RA1 may be set by the set mask. Bit RA0 may be cleared by the clear mask. The resulting value of the lowest two bits of port register 402 may be "10".

A fourth line of SRAM 401 may be "0000 0000 0000 0011", meaning that the set mask of circuit 410B is to be "0000 0000 0000 0011". The clear mask may be "0000 0000 0000 0011". The value of port register 402 may be loaded in buffer 408B. The highest fourteen bits may be unchanged. Bit RA1 may be set by the set mask. Bit RA1 may be set by the set mask. The values of "11" in the corresponding bits of the clear mask may be overridden. The resulting value of the lowest two bits of port register 402 may be "11".

Thus, the memory image of SRAM 401 might only be used to program channel 406B and its set mask register, rather than directly providing content of bit values for bit banging. DMA 404 takes advantage of the implied priority of the three bit manipulation functions. By defaulting the clear mask register's desired bits to '1', the incoming data bits from SRAM 401 will be cleared to '0' when the corresponding set mask bits are '0', thus accomplishing the desired outcome.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

We claim:

1. A memory management circuit, comprising:
a first direct memory access (DMA) channel, the DMA channel including:
logic configured to receive a first buffer of data to be written using DMA; and
a first circuit including logic configured to perform bit manipulation in real-time during a DMA write cycle of the first buffer of data; and
a second DMA channel, the second DMA channel including:
logic configured to receive a second buffer of data to be written using DMA; and
a second circuit including logic configured to perform bit manipulation in real-time during a DMA write cycle of the second buffer of data;
wherein:
the first buffer of data includes a bit indicating that a first in first out (FIFO) shift register is full;
the first circuit is configured to reset the bit indicating that the FIFO shift register is full during a rewrite of a byte including the bit while masking other bits of the byte;
the first DMA channel further includes logic to send a trigger to the second DMA channel;
the second DMA channel is further configured to load contents of the FIFO shift register into the second buffer upon reception of the trigger; and
the second circuit includes logic to write the second buffer to a destination during another DMA write cycle.

2. The memory management circuit of claim 1, further comprising logic in the first circuit configured to perform bit manipulation with a set function.

3. The memory management circuit of claim 1, further comprising logic in the first circuit configured to perform bit manipulation with a clear function.

4. The memory management circuit of claim 1, further comprising logic in the first circuit configured to perform bit manipulation with an invert function.

5. The memory management circuit of claim 1, further comprising logic in the first circuit configured to perform bit manipulation with a set function prioritized above a clear function.

6. The memory management circuit of claim 1, further comprising logic in the first circuit configured to perform bit manipulation with a set function prioritized above an invert function.

7. The memory management circuit of claim 1, further comprising logic in the first circuit configured to perform bit manipulation with a clear function prioritized above an invert function.

8. A memory management circuit, comprising:
a first direct memory access (DMA) channel, the DMA channel including:
logic configured to receive a first buffer of data to be written using DMA; and
a first circuit including logic configured to perform bit manipulation in real-time during a DMA write cycle of the first buffer of data; and
a second DMA channel, the second DMA channel including:
logic configured to receive a second buffer of data to be written using DMA; and
a second circuit including logic configured to perform bit manipulation in real-time during a DMA write cycle of the second buffer of data;
wherein:
the first buffer of data includes mask information for the second circuit;
the first circuit is configured to issue a trigger to the second DMA channel upon loading data into the first buffer; and
upon reception of the trigger, the second circuit is configured to apply bit manipulation using the mask information from the first buffer of data to the second buffer during a DMA write of the second buffer.

9. The memory management circuit of claim 8, wherein the second circuit is configured to write the second buffer to a source of the second buffer using the bit manipulation using the mask information.

10. A method, comprising:
receiving a first buffer of data in a first direct memory access (DMA) channel to be written using DMA;
in the first DMA channel, performing bit manipulation in real-time during a DMA write cycle of the first buffer of data, wherein the first buffer of data includes a bit indicating that a first in first out (FIFO) shift register is full;
receiving a second buffer of data in a second DMA channel to be written using DMA;
in the second DMA channel, performing bit manipulation in real-time during a DMA write cycle of the second buffer of data;

in the first DMA channel, resetting the bit indicating that the FIFO shift register is full during a rewrite of a byte including the bit while masking other bits of the byte;

sending a trigger to the second DMA channel from the first DMA channel;

in the second DMA channel, loading contents of the FIFO shift register into the second buffer upon reception of the trigger; and in the second DMA channel, writing the second buffer to a destination during another DMA write cycle.

11. The method of claim 10, further comprising performing the bit manipulation in the first DMA channel with a set function.

12. The method of claim 10, further comprising performing the bit manipulation in the first DMA channel with a clear function.

13. The method of claim 10, further comprising performing the bit manipulation in the first DMA channel with an invert function.

14. The method of claim 10, further comprising performing the bit manipulation in the first DMA channel a set function prioritized above a clear function.

15. The method of claim 10, further comprising performing the bit manipulation in the first DMA channel with a set function prioritized above an invert function.

16. The method of claim 10, further comprising performing the bit manipulation in the first DMA channel with a clear function prioritized above an invert function.

17. A method, comprising:
receiving a first buffer of data in a first direct memory access (DMA) channel to be written using DMA;
in the first DMA channel, performing bit manipulation in real-time during a DMA write cycle of the first buffer of data;
receiving a second buffer of data to be written using DMA in a second DMA channel:
performing bit manipulation in real-time during a DMA write cycle of the second buffer of data in the second DMA channel, wherein the first buffer of data includes mask information for the second circuit; and
issuing a trigger from the first DMA channel to the second DMA channel upon loading data into the first buffer; and
upon reception of the trigger, in the second DMA channel, applying bit manipulation using the mask information from the first buffer of data to the second buffer during a DMA write of the second buffer.

18. A microcontroller, comprising:
a processor;
a first direct memory access (DMA) channel, including:
logic configured to receive a first buffer of data to be written using DMA;
a first circuit including logic configured to perform bit manipulation in real-time during a DMA write cycle of the first buffer of data; and
a second DMA channel, including:
logic configured to receive a second buffer of data to be written using DMA; and
a second circuit including logic configured to perform bit manipulation in real-time during a DMA write cycle of the second buffer of data;
wherein:
the first buffer of data includes a bit indicating that a first in first out (FIFO) shift register is full;
the first circuit is configured to reset the bit indicating that the FIFO shift register is full during a rewrite of a byte including the bit while masking other bits of the byte;
the first DMA channel further includes logic to send a trigger to the second DMA channel;
the second DMA channel is further configured to load contents of the FIFO shift register into the second buffer upon reception of the trigger; and
the second circuit includes logic to write the second buffer to a destination during another DMA write cycle.

19. A microcontroller, comprising:
a processor;
a first direct memory access (DMA) channel, the DMA channel including:
logic configured to receive a first buffer of data to be written using DMA; and
a first circuit including logic configured to perform bit manipulation in real-time during a DMA write cycle of the first buffer of data; and
a second DMA channel, the second DMA channel including:
logic configured to receive a second buffer of data to be written using DMA; and
a second circuit including logic configured to perform bit manipulation in real-time during a DMA write cycle of the second buffer of data;
wherein:
the first buffer of data includes mask information for the second circuit;
the first circuit is configured to issue a trigger to the second DMA channel upon loading data into the first buffer; and
upon reception of the trigger, the second circuit is configured to apply bit manipulation using the mask information from the first buffer of data to the second buffer during a DMA write of the second buffer.

* * * * *